(12) United States Patent
Croci

(10) Patent No.: US 9,460,834 B2
(45) Date of Patent: Oct. 4, 2016

(54) METHOD FOR ADJUSTING A CALIBRATION ELEMENT, AND CORRESPONDING DEVICE

(71) Applicant: METALLUX SA, Mendrisio (CH)

(72) Inventor: Mattia Croci, Mendrisio (CH)

(73) Assignee: METALLUX SA, Mendrisio (CH)

( * ) Notice: Subject to any disclaimer, the term of this patent is extended or adjusted under 35 U.S.C. 154(b) by 0 days.

(21) Appl. No.: 14/390,533

(22) PCT Filed: Mar. 29, 2013

(86) PCT No.: PCT/IB2013/052553
§ 371 (c)(1),
(2) Date: Oct. 3, 2014

(87) PCT Pub. No.: WO2013/150435
PCT Pub. Date: Oct. 10, 2013

(65) Prior Publication Data
US 2015/0318087 A1    Nov. 5, 2015

(30) Foreign Application Priority Data

Apr. 3, 2012 (IT) ................ TO2012A0293

(51) Int. Cl.
*H01C 10/00* (2006.01)
*H01C 17/24* (2006.01)
*G01L 25/00* (2006.01)
(Continued)

(52) U.S. Cl.
CPC ............. *H01C 17/24* (2013.01); *G01L 9/0052* (2013.01); *G01L 9/04* (2013.01); *G01L 25/00* (2013.01); *G01L 27/002* (2013.01); *H01C 10/00* (2013.01); *H01C 17/23* (2013.01); *H01C 17/242* (2013.01); *Y10T 29/49004* (2015.01); *Y10T 29/49005* (2015.01); *Y10T 29/49083* (2015.01)

(58) Field of Classification Search
CPC ........ H01C 1/014; H01C 1/08; H01C 13/02; H01C 17/23; H01C 17/242; H01C 17/22; H01C 17/245
USPC ........ 338/195, 287, 307, 293, 332; 29/610.1
See application file for complete search history.

(56) References Cited

U.S. PATENT DOCUMENTS 4,050,049 A   9/1977   Youmans
4,322,707 A   3/1982   Ort
(Continued)

FOREIGN PATENT DOCUMENTS

JP   62048573 A   3/1987
JP   10170370 H   6/1998
(Continued)

OTHER PUBLICATIONS

International Search Report for PCT/IB2013/052553 dated Jul. 10, 2013.

*Primary Examiner* — Kyung Lee
(74) *Attorney, Agent, or Firm* — Heslin Rothenberg Farley & Mesiti P.C.; Victor A. Cardona, Esq.

(57) ABSTRACT

A method for adjusting the electrical behavior or characteristics of a calibration element includes adjusting the electrical behavior or characteristics of the calibration element by making one or more incisions or cuts in the calibration element. The calibration element has a plurality of apertures, and the method includes making an incision or cut in the calibration element between an edge thereof and at least one of the apertures, and/or making an incision or cut in the calibration element between at least two of the apertures.

19 Claims, 14 Drawing Sheets

(51) Int. Cl.
  *G01L 9/00* (2006.01)
  *G01L 27/00* (2006.01)
  *G01L 9/04* (2006.01)
  *H01C 17/23* (2006.01)
  *H01C 17/242* (2006.01)

(56) References Cited

U.S. PATENT DOCUMENTS

| | | | |
|---|---|---|---|
| 4,331,035 A | 5/1982 | Eisele et al. | |
| 4,462,018 A | 7/1984 | Yang et al. | |
| 4,511,877 A | 4/1985 | Nishikawa et al. | |
| 4,747,456 A | 5/1988 | Kitagawa et al. | |
| 5,227,760 A | 7/1993 | Kobayashi | |
| 5,309,136 A | 5/1994 | Rezgui et al. | |
| 6,003,380 A | 12/1999 | Sasaki et al. | |
| 6,107,909 A * | 8/2000 | Kosinski | H01C 17/24 29/610.1 |
| 6,462,304 B2 * | 10/2002 | Kaida | H01C 17/242 219/121.69 |
| 7,800,479 B2 * | 9/2010 | Yamashita | H01C 17/242 219/121.67 |
| 7,843,309 B2 * | 11/2010 | Zandman | H01C 1/014 338/195 |
| 8,319,598 B2 * | 11/2012 | Zandman | H01C 1/014 338/195 |
| 8,432,247 B2 * | 4/2013 | Wang | H01L 27/0288 338/195 |
| 2003/0226829 A1 | 12/2003 | Aoki et al. | |
| 2007/0013474 A1 * | 1/2007 | Cutuli | H01C 1/14 338/195 |
| 2007/0018781 A1 * | 1/2007 | Yamashita | H01C 17/242 338/195 |

FOREIGN PATENT DOCUMENTS

| | | |
|---|---|---|
| JP | 2006234384 A | 9/2006 |
| JP | 2010243192 A | 10/2010 |

* cited by examiner

METHOD FOR ADJUSTING A CALIBRATION ELEMENT, AND CORRESPONDING DEVICE

CROSS REFERENCE TO RELATED APPLICATIONS

This application is a National Stage of PCT International Application No. PCT/IB2013/052553, filed on Mar. 29, 2013, and published in English on Oct. 10, 2013 as WO 2013/150435 A1, which claims priority from Italian Patent Application No. TO 2012 A 000293 filed on Apr. 3, 2012, the entire disclosures of which are incorporated herein by reference.

FIELD OF THE INVENTION

The disclosure relates to calibration and adjustment techniques.

The invention has been developed with a view to its possible use for carrying out adjustment of an electrical or electronic device or circuit.

DESCRIPTION OF THE PRIOR ART

Known in the art are various solutions for adjusting and/or calibrating the electrical behaviour of an electrical or electronic device or circuit, for example by varying the value of the electrical resistance of a resistive element. In this context, the person skilled in the branch will appreciate that the definitions "adjustment" or "calibration", albeit indicated individually or separately in the description, are also intended to indicate elements and/or processes that are equivalent or complementary.

For instance, the adjustment referred to above is frequently required for calibrating a force transducer, such as, for example, a pressure sensor.

For example, FIGS. 1$a$ and 1$b$ show different views of a typical pressure sensor 1.

In the example considered, the pressure sensor 1 has a sensor body including a displaceable part or portion, i.e., one that is deformable and/or movable, such as for example a membrane portion 10. The membrane portion 10 may be defined integrally in the sensor body, for instance when this is of a monolithic type (for example, made of ceramic material, such as alumina), or else may be configured as a part that is applied thereto. In the schematic example represented, the membrane portion 10, hereinafter referred to for simplicity as "membrane", is exposed to a first pressure P1 on the upper side and to a second pressure P2 on the under side. Consequently, the membrane 10 is deformed or displaced on account of the difference between the forces developed by the pressures P1 and P2.

For instance, for absolute-pressure sensors one of the pressures P1 or P2 is fixed and pre-set. In this case, the membrane 10 is typically associated to a chamber 12 that is at the pre-set pressure. For example, the aforesaid fixed pressure can be set during production through an opening 14, which is then closed.

As mentioned previously, the deformation or displacement of the membrane is proportional to the difference between the pressures P1 and P2. For instance, in the case of piezoresistive pressure sensors, the deformation of the membrane 10 is detected via at least one piezoresistive element. The aforesaid piezoresistive element is a resistive element that follows the deformation of the surface of the membrane 10 to which it is fixed, and the respective deformations cause a variation of the electrical resistivity of the material of the resistor, and consequently of its electrical resistance. Instead of piezoresistive elements, other types of strain gauges may also be used, such as for example wire or metal-layer strain gauges.

For example, FIG. 1$b$ shows a typical configuration in which four piezoresistive resistors R1, R2, R3 and R4 are used, which are connected together to form a Wheatstone bridge. Typically, the resistors R2 and R3 are set at the centre of the membrane 10, whereas the resistors R1 and R4 are set at the perimeter of the membrane 10. Consequently, at least the resistances of the resistors R2 and R3 vary.

In one embodiment, the resistors R1 and R4 are set close to the edge of the membrane 10 but always on the flexible part.

In this way, the resistors R1 and R4 perform an action opposite to the resistors R2 and R3 and increase the piezoresistive effect, in so far as by applying a pressure, the resistors R2 and R3 lengthen, whereas the resistors R1 and R4 shorten.

In one embodiment, in the case where the temperature compensation were necessary, two PTC resistors may for example be added, one for each branch.

For instance, FIG. 1$c$ shows a circuit diagram of a typical connection of the resistors R1, R2, R3, and R4.

In particular, in the example considered, the Wheatstone bridge is supplied by a voltage Vdd that is applied between two terminals HI and I.

For example, for the arrangement of sensors shown in FIG. 1$c$, the resistors R3 and R1 form a first voltage divider connected between the terminals HI and I, and the resistors R4 and R2 form a second voltage divider connected between the terminals HI and I.

Consequently, according to the well known principles of the Wheatstone bridge, the voltage across the resistor R3, i.e., the voltage between the terminal HI and the intermediate point S− of the first voltage divider R3, R1, is $$V_{R3} = V_{HI,S-} = Vdd \cdot \frac{R3}{R1 + R3} \qquad (1)$$

and the voltage across the resistor R4, i.e., the voltage between the terminal HI and the intermediate point S+ of the second voltage divider R4, R2, is $$V_{R4} = V_{HI,S+} = Vdd \cdot \frac{R4}{R2 + R4} \qquad (2)$$

Consequently, the voltage $V_S$ between the terminals S+ and S− is $$V_S = V_{R4} - V_{R3} = Vdd \cdot \left( \frac{R4}{R2 + R4} - \frac{R3}{R1 + R3} \right) \qquad (3)$$
$$= Vdd \cdot \frac{R1 \cdot R4 - R2 \cdot R3}{(R2 + R4)(R1 + R3)}$$

whence the balancing condition is obtained:

$$V_S = 0 \text{ for } R1 \cdot R4 = R3 \cdot R2 \qquad (4)$$

Typically, all the elements R1, R2, R3 and R4 have the same resistance, namely, $$R1 = R2 = R3 = R4 = R \qquad (5)$$

In the example considered, the bridge is hence unbalanced via the variations of the resistances of the sensors R2 and R3 around the respective initial values R, namely, $$V_S = Vdd \cdot \frac{R^2 - (R + \Delta R)(R + \Delta R)}{(R + \Delta R + R)(R + R + \Delta R)} \quad (6)$$

$$= Vdd \cdot \frac{-2R\Delta R - \Delta R^2}{(2R + \Delta R)^2}$$

As mentioned previously, also the resistances of the resistors R1 and R4 can vary to increase the variation of the voltage $V_S$.

Consequently, for small variations $\Delta R \ll R$ it follows that $$V_S \propto \Delta R \quad (7)$$

However, on account of the production spread, the aforesaid resistances have slightly different values, and the bridge is unbalanced; i.e., the condition of Eq. (4) is not always satisfied.

Consequently, to calibrate the pressure sensor 1, a resistance connected in series or in parallel to a resistance of the bridge is frequently used.

For instance, FIG. 1d shows an example in which a calibration resistor RC is connected in series to the piezoresistive element R4.

OBJECT AND SUMMARY OF THE INVENTION

The inventors have noted that the adjustment of such a resistance, or in general of a calibration element, is particularly complex.

Moreover, the inventors have noted that the adjustment of such a calibration element may also present problems linked to the reliability and/or stability over time.

One object of the invention is hence to provide a method for adjusting a calibration element of a force transducer in a simple and precise way.

A further object of the invention is to improve the reliability and/or stability in time of the calibration, thus improving also the quality of the force transducer.

According to the invention, one or more of the aforesaid objects are achieved thanks to a method for adjusting a calibration element having the characteristics recalled in the ensuing claims. The claims also regard a corresponding device, such as for example an electrical or electronic circuit, a transducer or a sensor, or a heater.

The claims form an integral part of the technical teaching provided herein in relation to the invention.

As mentioned previously, the present description has the purpose of providing solutions for adjusting a calibration element.

In various embodiments, the electrical behaviour of the calibration element is adjusted by making one or more incisions in the calibration element.

In particular, in various embodiments, the calibration element comprises a plurality of apertures, preferably apertures within the calibration element, and the signal is adjusted via at least one of the following operations:
  cutting the calibration element between an edge thereof and at least one of the apertures; and
  cutting the calibration element between at least two of said apertures.

BRIEF DESCRIPTION OF THE DRAWINGS

Further purposes, characteristics and advantages of the present invention will emerge clearly from the ensuing detailed description and from the annexed drawings, which are provided purely by way of explanatory and non-limiting example and in which FIGS. 1a to 1d have already been described previously.

DETAILED DESCRIPTION OF EMBODIMENTS

Illustrated in the ensuing description are various specific examples and/or details aimed at an in-depth understanding of the invention and/or of the corresponding embodiments. The embodiments may be provided without one or more of the specific details, or with other methods, components, materials, etc. In other cases, some components or structures or materials or operations are not illustrated or described in detail so that various other aspects of the embodiments according to the invention will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of the present description do not necessarily refer to one and the same embodiment. Moreover, particular conformations, structures or individual characteristics, described with reference to one or more examples according to the invention, may be adequately combined in one or more embodiments.

The references used herein are provided only for convenience and do not define or consequently limit the sphere of protection or the scope of the various embodiments.

As mentioned previously, one of the purposes of the present disclosure is that of adjusting a calibration element of a device, such as for example a sensor, a transducer, a heater, and/or an electrical or electronic circuit.

For instance, in various embodiments, the aforesaid calibration element is a resistive element, such as a calibration resistance of a force transducer, and adjustment of the aforesaid calibration resistance is made during production of the transducer itself.

In the ensuing description, reference will be made above all to a pressure sensor and to a Wheatstone bridge. However, in general, the adjustment techniques described herein may also be used for other sensors and/or other measurement bridges. In fact, the adjustment techniques described herein can be used in all the applications in which it is necessary to adjust a calibration element, such as for example the field of transducers, sensors, resistive heaters, analog or hybrid circuits, etc. Moreover, the calibration techniques described herein may be used not only for adjusting the electrical resistance of a resistive element, but may also be used, for instance, for adjusting the capacitance of a capacitive element and/or the inductance of an inductive element, i.e., in general for adjusting the impedance of an impedance element. Consequently, the adjustment techniques described herein may be used, for example, also for adjusting capacitive and/or inductive transducers.

Figure 2:
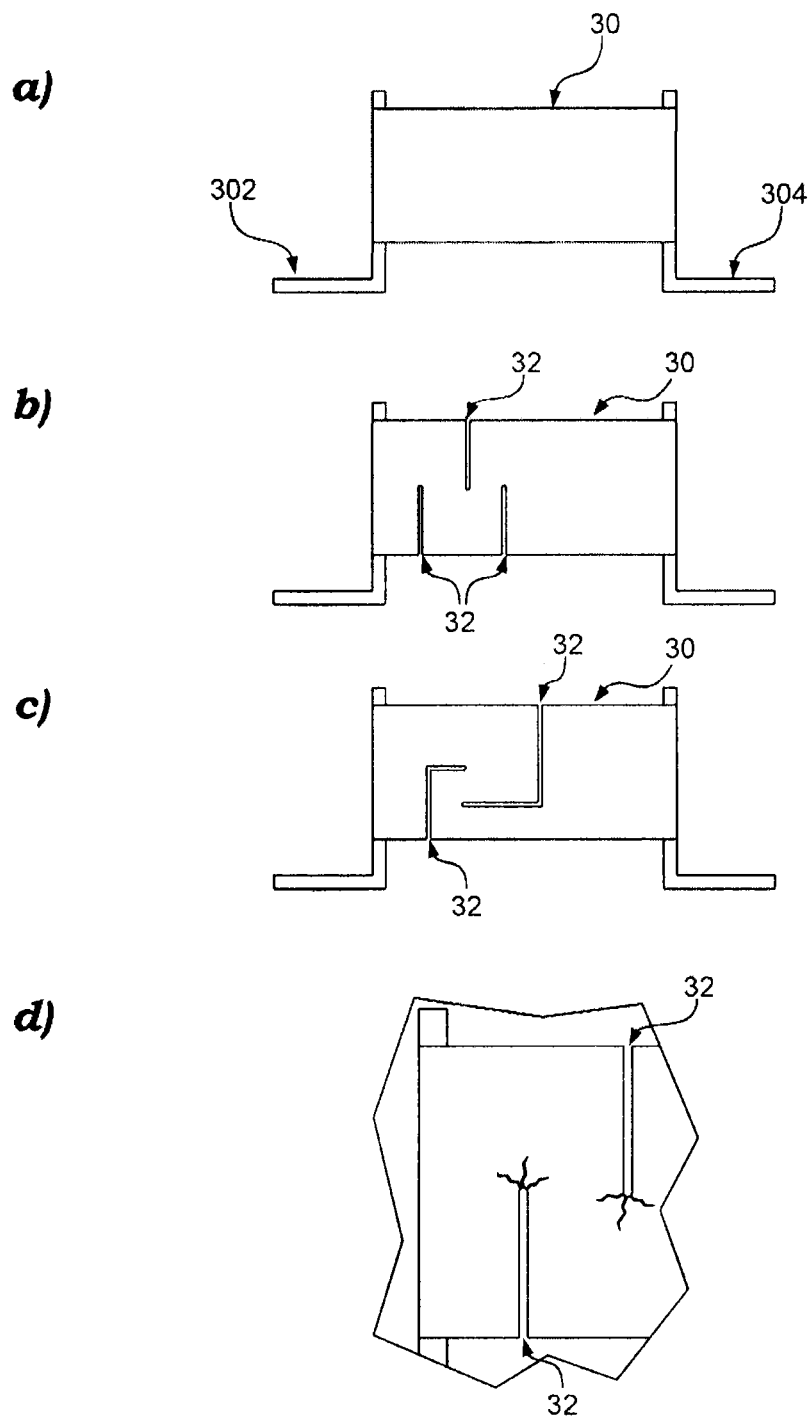
FIGS. 2a to 2d illustrate some disadvantages of known calibration techniques.

FIG. 2a shows a typical resistive element 30, such as for example an electrical path or a layer of resistive material, having two terminals 302 and 304. For instance, such an electrical path may be created within an integrated circuit via a process of serigraphy, lithography, or deposition. The resistive element 30 could also be made of some other material, such as carbon, graphite, talcum, clay, metal oxide, metallic paints, or a mixture of the aforesaid substances.

The electrical resistance of such an element 30 is directly proportional to its length and is inversely proportional to its cross section.

Consequently, the value of the resistance of such an element 30 may be modified by making small incisions, for example, using laser or abrasive blasting of a part of the path.

For instance, FIGS. 2b and 2c show two examples of incisions or cuts 32 that modify the electrical resistance of the element 30.

However, as shown also in FIG. 2d, the aforesaid incisions or cuts 32 present the typical defect of having an irregular profile, in particular in the terminal area of the cut, where the points of stress concentration or failure are typically generated, which cause the cut to propagate in time. Consequently, the value of the adjustment may vary over time, above all for sensors that undergo deformation, such as force transducers, for example pressure sensors, or devices exposed to thermal and/or mechanical stresses.

For instance, a laser cut extending as far as the centre of the path, which in time determines formation of a crack that propagates towards the opposite end, can modify substantially the effective length and/or cross section of the resistive element 30 and, consequently, also its electrical resistance. For example, in the extreme case where the crack propagates as far as the opposite end or as far as the adjacent cut, the resistive element would be interrupted.

Consequently, adjustment or calibration of a device via one or more cuts made in a calibration element is particularly complex and presents some risks or drawbacks, for example, as regards the reliability and/or stability in time of the aforesaid adjustment or calibration.

For this reason, according to the present invention, there is proposed the use of a calibration element, such as for example a resistive element, that will enable the above phenomenon to be prevented or at least reduced.

Moreover, according to the present invention, there is proposed the use of a calibration element that enables an easier calibration or adjustment, preferably compensating or rendering ineffective any possible tolerance in positioning of the cut.

In particular, the calibration element of the present description comprises a plurality of apertures or holes 34, i.e., areas of the calibration element without material, preferably delimited or surrounded in part by the material of the calibration element. The aforesaid apertures or holes 34 have a predefined profile, preferably obtained with criteria that reduce creation of points of initiation of the aforementioned cracks, such as for example a profile without corners or vertices or intersection points, preferably a curved or circular profile.

For instance, FIGS. 8a to 8g show some embodiments of possible apertures 34.

In particular, the inventors have noted that apertures with a rectangular or square cross section are not always suited to reducing the risk of cracks on account of the vertices that are likely to originate cracks, such as vertices with internal angles close to 90°.

Instead, the inventors have found that sections without vertices or corners, such as for example the aforesaid curved profiles, in particular circular holes (see FIG. 8b) or elliptical or oval holes (see FIG. 8a), are particularly resistant against onset of cracks.

Figure 8:
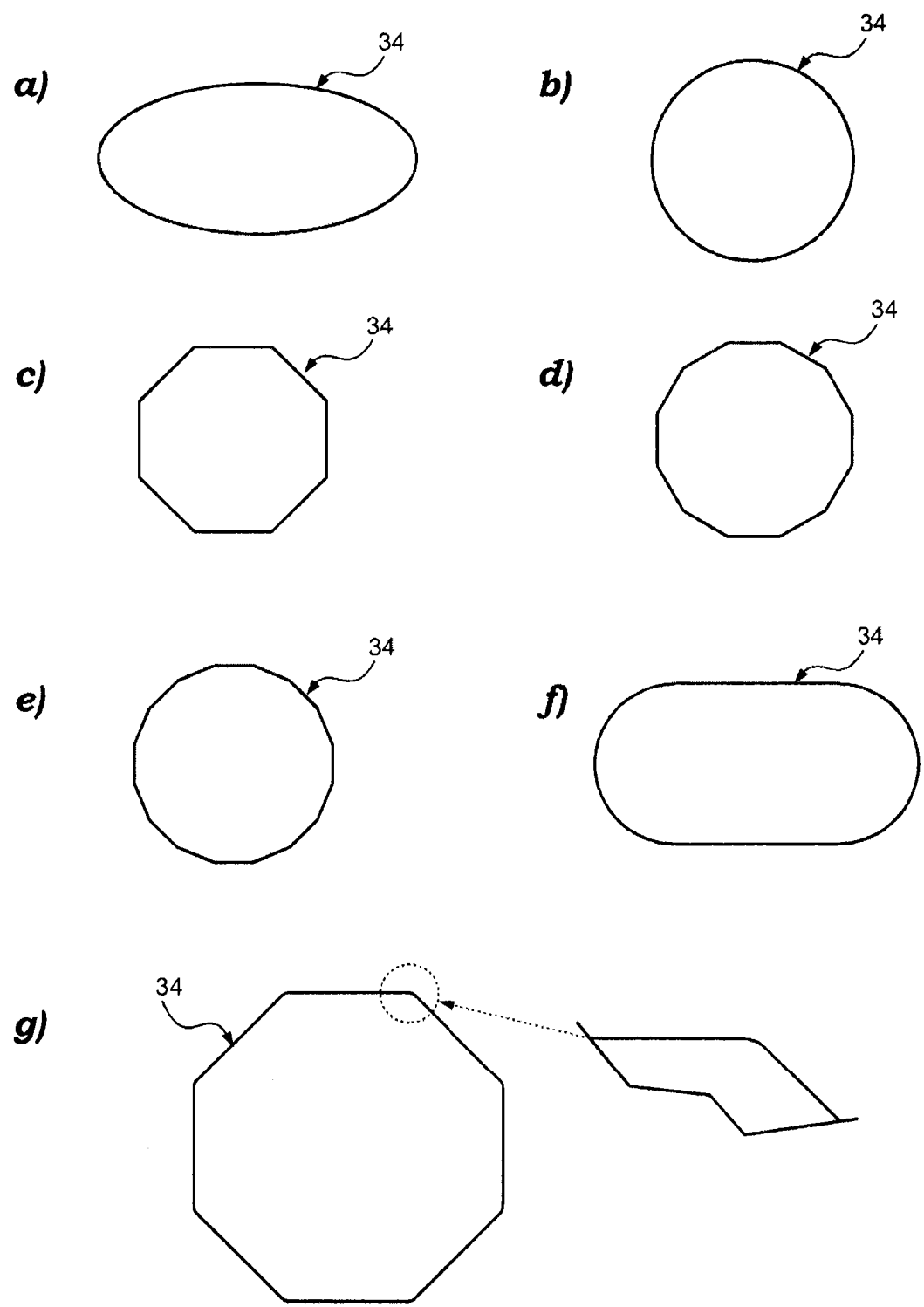

However, sections with closed curved or polygonal profiles that comprise only vertices with an internal angle greater than 90°, for instance comprised between 105° and 180°, are also acceptable to reduce the risk of cracking (see FIGS. 8c, 8d and 8e).

The holes 34 may also have shapes made up of curved stretches and linear stretches (see FIG. 8f). For instance, the vertices of the polygonal profiles may be obtained with curved stretches (see FIG. 8g), preferably at least one curved stretch comprised between two rectilinear or linear stretches, in particular at least one curved stretch located at the vertex of a corner, such as a curved stretch with a radius of at least 0.05 mm or more, preferably with a radius of at least 0.2 mm.

For instance, FIGS. 3a to 3d show possible arrangements of the apertures 34 provided according to the invention.

In particular, in the embodiments considered, the apertures 34, such as for example circular holes, are set at the same distances apart along longitudinal lines.

Figure 3:
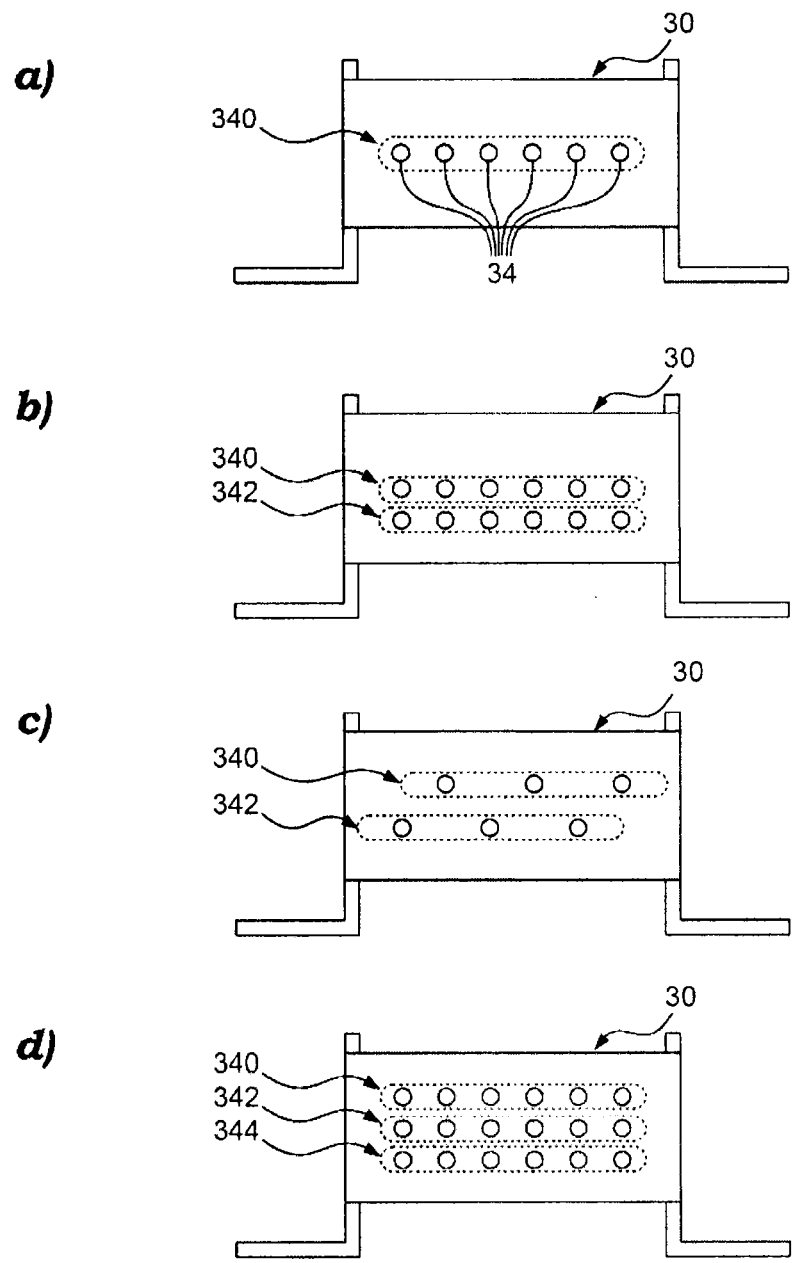
FIGS. 3 to 9 illustrate various embodiments of the calibration techniques according to the present invention.

In particular, in FIG. 3a only a single row 340 of apertures 34 is provided, in FIGS. 3b and 3c two rows 340 and 342 of apertures 34 are provided, and in FIG. 3d three rows 340, 342 and 344 of apertures 34 are provided.

FIG. 3c shows that the rows, or in general the apertures 34, may also be staggered with respect to one another in a longitudinal direction.

In various embodiments, the apertures 34 are set, instead, along transverse lines. Consequently, various embodiments described herein for rows of apertures may also be applied to columns of apertures. For instance, the columns, or in general the apertures 34, may even be staggered with respect to one another in a lateral direction.

In general, for rectangular calibration elements, by "longitudinal direction" is meant the direction of an axis that extends between the two contacts or electrodes 302 and 304, whereas the "lateral or transverse direction" is a direction orthogonal to the aforesaid axis.

In general, the apertures 34 may be hence arranged according to an arbitrary scheme. For instance, the apertures 34 may also be set along a diagonal line or a curved line or a line with different stretches or a variable pattern.

Consequently, in order to render the drawings more readily understandable, some figures might not indicate explicitly the references of the apertures 34, but the apertures 34 could be indicated simply as rows of holes designated by the numbers 340, 342 and/or 344. Moreover, also some elements, such as for example the terminals 302 and 304, may be omitted in some figures if their presence is not strictly necessary for an understanding of the figure.

FIGS. 4a to 4m show in this context possible incisions 32, which can made, for example, via laser cutting, microabrasion, and/or abrasive blasting. In particular, in the embodiments considered, the cut 32 starts from a side edge of the element 30 and proceeds linearly up to one of the apertures 34.

Figure 4:
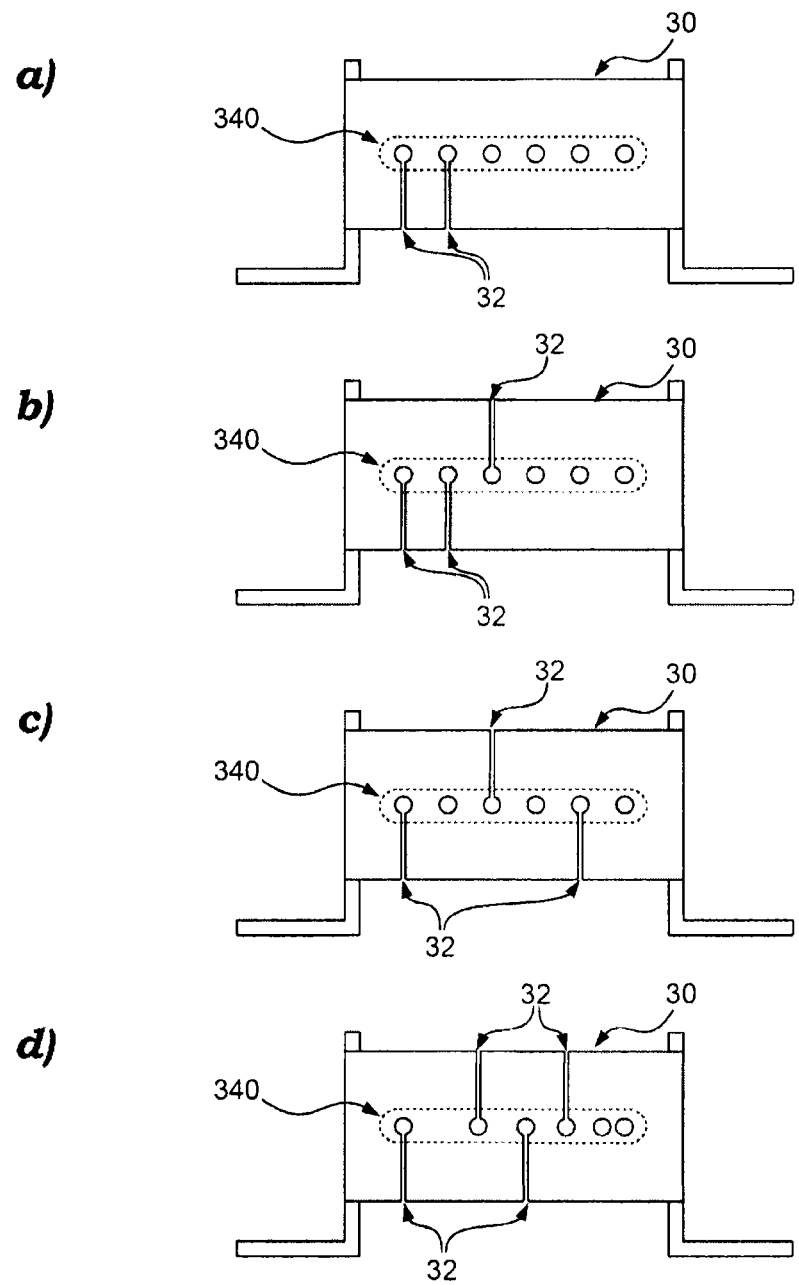
Figure 4:
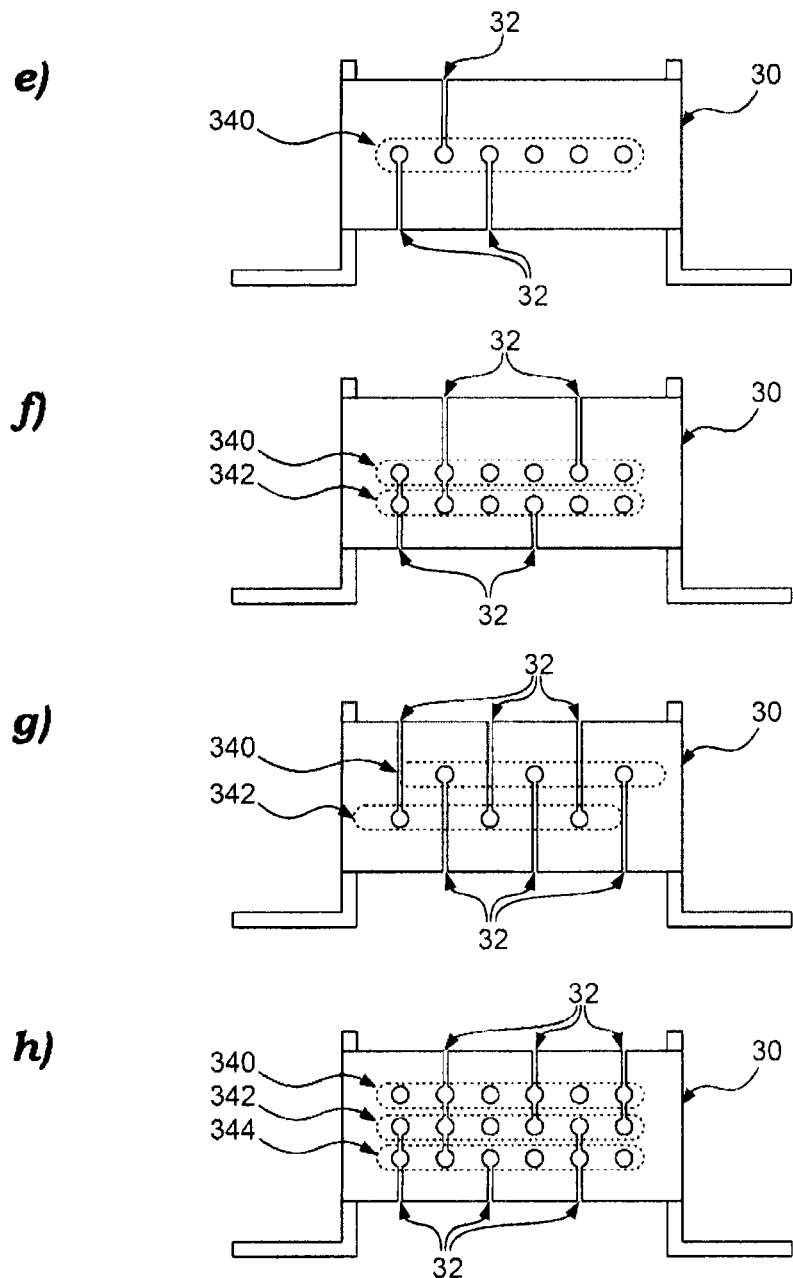
Figure 4:
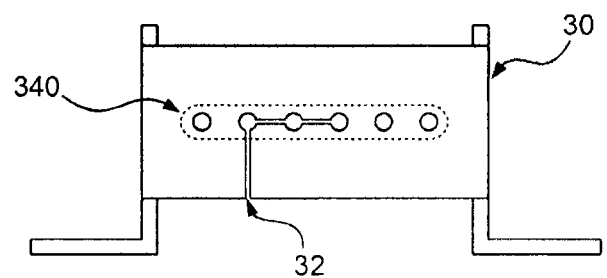
Figure 4:
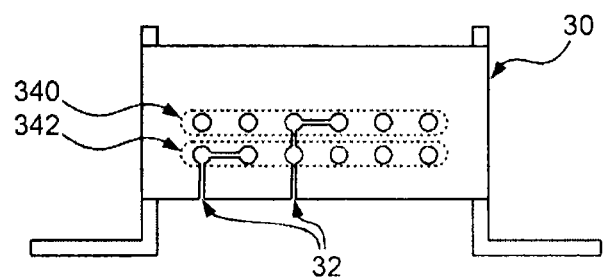
Figure 4:
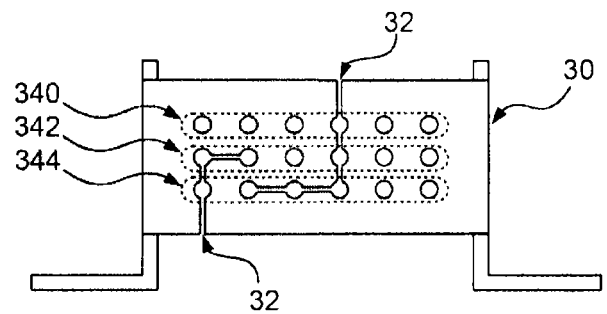
Figure 4:
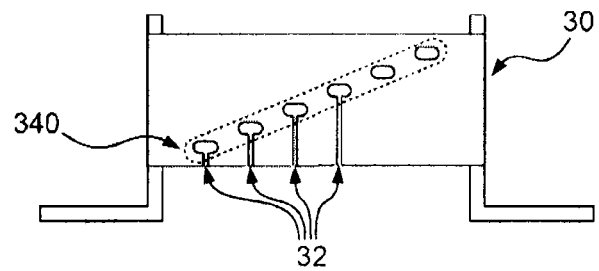
Figure 4:
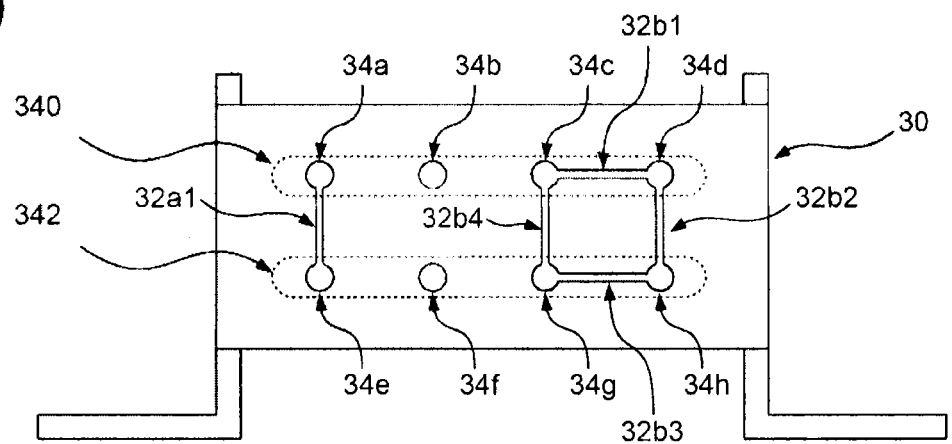

For instance, in FIG. 4a, the cuts 32 always start from one and the same lateral edge, whereas in FIGS. 4b to 4d cuts are provided that start from opposite edges.

In general, is not necessary for a cut to be made for each aperture 34. For instance, as shown in FIG. 4c, some of the apertures 34 could be skipped and without cuts.

In various embodiments, the at least one cut 32 can also proceed towards other apertures 34 in a transverse direction (see, for example, FIGS. 4f and 4h) or in a longitudinal direction (see, for example, FIG. 4i). In general, the final profile may also be made up of a combination of lateral and longitudinal cuts (see, for example, FIGS. 4j and 4k).

Finally, FIG. 4l shows an embodiment in which the apertures 34, such as for example oval holes, are set along a diagonal 340.

For instance, in this embodiment, each cut 34 can have a different length, in particular in the case of a cut that starts from the edge or side. In addition, since the holes are typically off-centre, also the side from which the cut starts changes the effect of the cut. As an alternative or in addition there could be provided diagonal cuts (not shown), from one aperture to another.

Consequently, in the embodiments described previously, the calibration element 30, such as, for example, a resistive element, comprises a plurality of apertures 34, and the electrical behaviour, such as, for example, the resistance, capacitance and/or inductance, is adjusted with one or more cuts 32 that extend from at least one edge of the calibration element 30, such as the side edge, as far as at least one of the apertures 34.

FIG. 4m shows, instead, an embodiment in which only incisions between the apertures 34 are made.

In particular, in the embodiment considered, the calibration element comprises eight apertures 34a, 34b, ..., 34h.

As mentioned previously, the aforesaid apertures 34a ... 34h can be set arbitrarily within the calibration element 30. For instance, in the embodiment considered, the apertures are set at the same distance from one another in two rows 340, 342.

In the embodiment considered, two incisions 32a and 32b are made. The first incision 32a comprises only a single segment of cut 32a1, which extends between the apertures 34a and 34e, for example, in a lateral direction for the arrangement shown in FIG. 4m.

Instead, the second incision 32b comprises four segments of cut 32b1 ... 32b4. In particular, in the embodiment considered:

the segment of cut 32b1, for example a longitudinal cut, extends between the apertures 34c and 34d,
the segment of cut 32b2, for example a lateral cut, extends between the apertures 34d and 34h,
the segment of cut 32b3, for example a longitudinal cut, extends between the apertures 34g and 34h, and
the segment of cut 32b4, for example a lateral cut, extends between the apertures 34c and 34g, i.e., the second incision 32b cuts out a segment of the calibration element 30.

Consequently, in general, the electrical behaviour of the calibration element 30, such as, for example, the resistance, capacitance and/or inductance, is calibrated via one or more cuts 32 that extend:

a) between an edge of the element 30 and an aperture 34, and/or
b) between at least two apertures 34.

In general, the aforesaid cuts can have arbitrary paths, even though linear cuts, for example in a lateral or longitudinal direction, are preferable. The aforesaid cuts could, if need be, have a profile that is at least in part curved or curvilinear or with variable stretches and/or be linear cuts set at an angle with respect to the aforesaid lateral direction and/or the aforesaid longitudinal direction, such as curved or curvilinear or angled cuts that extend between the aforesaid edge and at least one aperture 34 and/or that extend between at least two apertures 34.

Figure 5:
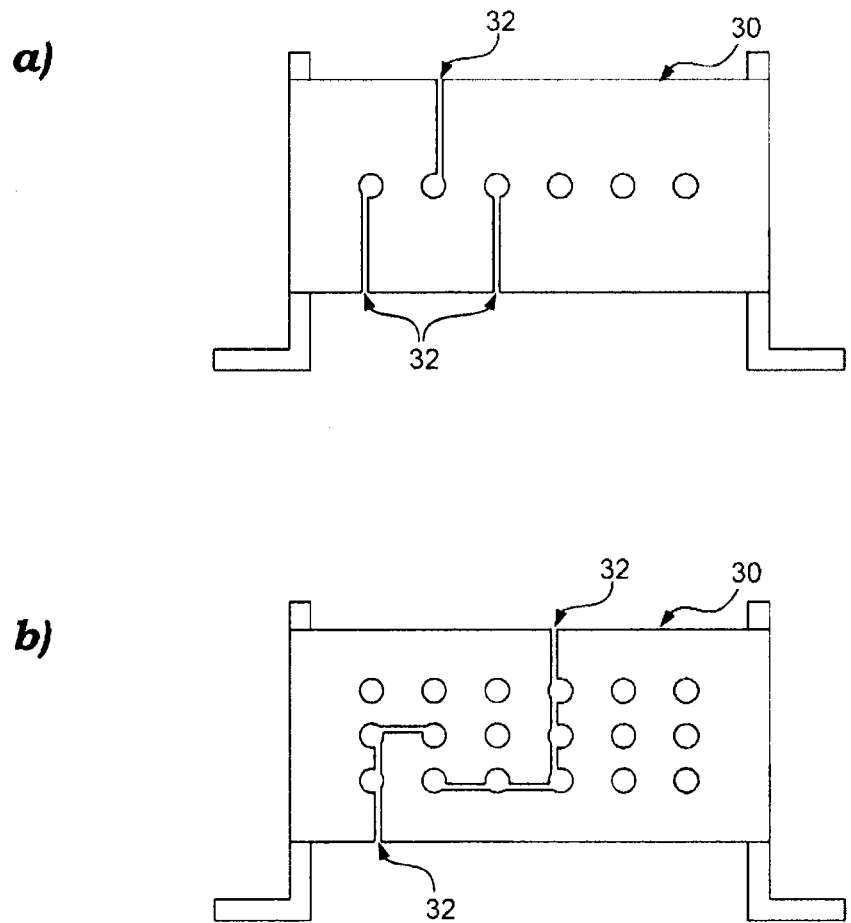

FIGS. 5a and 5b represent the fact that minor tolerances in the position and length of the at least one cut 32 do not determine substantial variations in the adjusted value, such as for example the electrical resistance.

In fact, variations in the length of the cut 32 can be compensated, in so far as it is sufficient for the cut 32 to reach the aperture. In fact, the variations in the area of the aperture 34 that do not entail a removal of material do not vary the value of the resistance. Likewise, variations in the transverse positioning of the laser and/or of the cut, such as lateral and/or longitudinal variations are also compensated.

Figure 6:
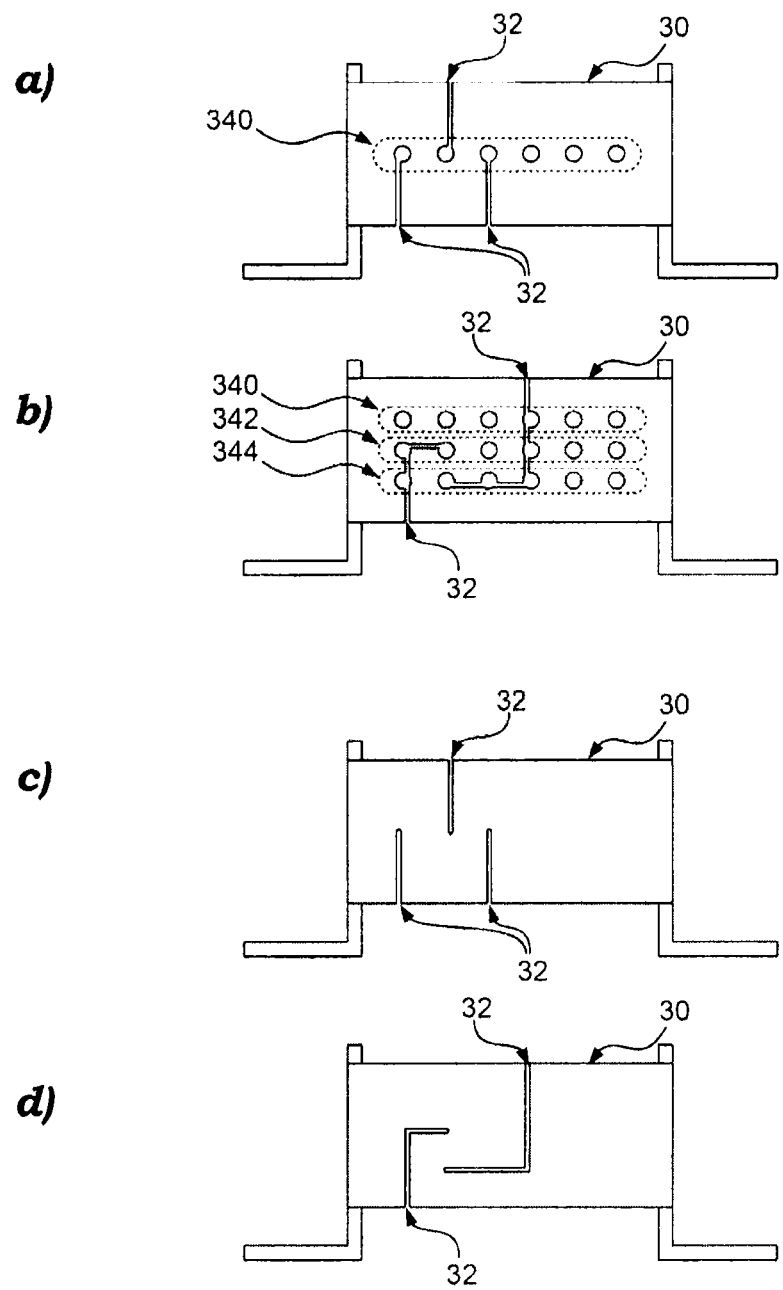

In fact, FIGS. 6a to 6d show directly the comparison between known adjustment systems (see FIGS. 6c and 6d) and the present solution (see FIGS. 6a and 6b). In particular, whereas in the known art an "analog" adjustment is used that is based upon the exact length and/or position of the cut 32, in the present solution a "digital" approach is adopted, which is based upon segments of cut that can have greater tolerances for length and/or position of the cut.

The person skilled in the branch will appreciate that this "digital" approach presents the disadvantage that the value of the resistance might not be settable continuously. However, using calibration elements 30 that have a sufficient length and an adequate number of apertures 32, this effect is negligible, at least for the sector of calibration of transducers for physical quantities. In fact, in the aforesaid sector the stability of calibration over time is usually more important.

In general, the inventor has noted that the effect of each cut depends upon various parameters, such as, for example, the resistive/capacitive/inductive value of the material used for the calibration element, the cutting sequence, the distance between the holes, and/or the length of the cut.

The variation of the electrical behaviour of the calibration element, for example the value of the calibrated resistance, may be determined, for instance, via simulation, processing, and/or measurement, for example measuring the value of the resistance of the element 30. However, whereas in the known solutions it was necessary to measure the aforesaid resistance continuously, on account of the different tolerances of the cut, in the present solution it is sufficient to measure the value of the resistance for each segment of cut.

Prior to and/or following upon the aforesaid measurement, knowing in particular the pre-defined arrangement of the apertures and the value of the element 30, it is possible to process appropriately the data to define the effect or incidence of each individual cut and then process or define the subsequent adjustment steps, such as for example definition or identification of the apertures between which or towards which it is advisable to make the cuts. The aforesaid operations may, for instance, comprise a definition of first cuts based upon the aforesaid processing, a subsequent measurement of the value of adjustment obtained with the cuts, and processing of the data to define any further cuts.

Figure 7:
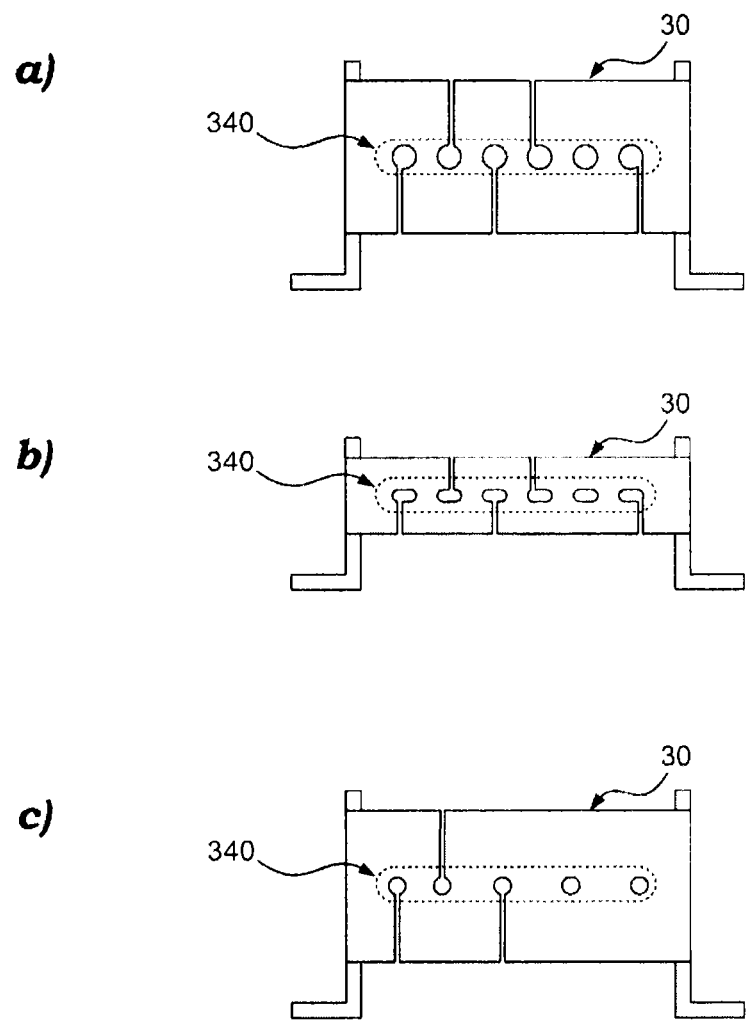

As mentioned previously with reference to FIGS. 8a to 8g, the apertures 34 may have different shapes and diameters. For instance, for typical cutting processes, it is sufficient for the diameter of the apertures 34 to be slightly greater than the width of the cut 32. However, the specific diameter required depends upon the tolerances for the length and positioning of the cut. For instance, a larger diameter (see, for example, FIG. 7a) enables greater tolerances of positioning of the cut. For this reason, apertures 34 with oval or elliptical cross section (see for example FIG. 7b) may prove particularly advantageous, because typical cutting machines may have different tolerances for the X axis and the Y axis, and the length and width of the apertures 34 may be proportional to the aforesaid tolerances.

In addition, the apertures 34 with an oval or elliptical cross section (see, for example, FIG. 7b) may be particularly advantageous to reduce the overall dimensions of the aperture in at least one direction, such as the lateral direction, enabling use of an element 30 with a smaller width and/or a reduced dimension in the lateral direction.

In general, one of the dimensions of the aperture 34, i.e., the width and/or the length, is greater than the width of the cuts 32, for instance, at least twice the width of the cut and even more preferably between three and ten times the width of the cut.

Moreover, the apertures 34 may be set at the same distances apart (see, for example, FIG. 7a) or also at variable distances (see, for example, FIG. 7c), for instance, to change the effect of each cut 32.

As mentioned previously, in the case where the cuts are set along straight lines, the adjustment of the calibration element 30 is "digital", and the impedance of the calibration element 30, for example its resistance, may be set only via selection of the apertures 34 and of the number of the cuts 32. Consequently, even though this approach is very easy to implement, the value of the impedance might not be settable continuously. As mentioned also previously, using calibration elements 30 with a sufficient length and an adequate number of apertures 32, this effect may be negligible.

However, in some technological sectors, this is not always possible, and consequently an "analog" adjustment might prove necessary, i.e., an adjustment in which the impedance of the calibration element 30, such as for example its resistance, can be set continuously.

The inventor has noted that such an "analog" adjustment can also be obtained with the calibration elements 30 described herein. In fact, according to the present invention, a cut always starts from an area without material and terminates in an area without material, but can follow an arbitrary path. Consequently, it is possible to implement an analog adjustment by controlling the path of the cut 32 between these two areas without material. For instance, FIGS. 9a and 9b shows an embodiment of an analog calibration, in which a calibration element 30 with a trapezial shape is used, i.e., a calibration element in which the section, such as for example the cross section, is variable along the length, for instance, in order to obtain different at each cut. However, also the other calibration elements 30 described previously could be used.

In the embodiment considered, in order to adjust the calibration element 30, also linear cuts may be made, such as for example cuts that set in an approximate way the value of the adjustment in a "digital" way. For instance, FIGS. 9a and 9b shows two linear cuts 32 that start from the side edge and terminate in two respective apertures 34.

Instead, in order to carry out analog adjustment, at least one cut or segment of cut follows a path that is not linear.

Figure 9:
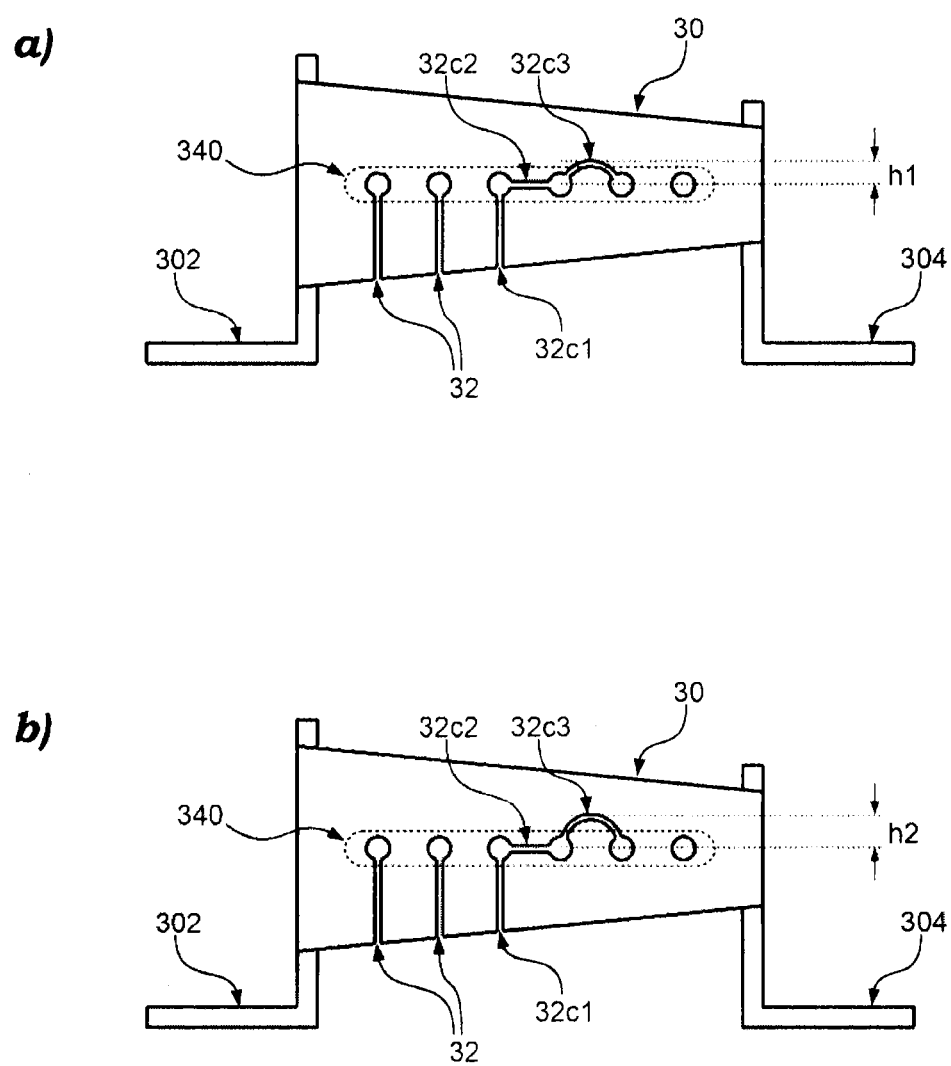

For instance, in the embodiment considered, the calibration element 30 comprises a cut 32c3 that has a curved shape, for example a cut that follows an arc of circumference. Also the aforesaid cut may be made between the edge and an aperture or (as shown in FIG. 9) between two apertures. Moreover, the aforesaid curved cut 32c3 may also be a segment of cut that forms part of a composite incision comprising other segments of cut, such as, for example, two linear (or even curved) segments of cut 32c1 and 32c2.

For instance, in the embodiment considered, the value of the adjustment may be set continuously by setting the height of the cut with respect to the apertures, for example by setting the radius of the arc of circumference.

In particular, FIGS. 9a and 9b shows two different curved cuts 32c3 that have two different heights h1 and h2, via which it is possible to vary the width of the path (width between the cut 32c3 and the edge) by a variable value, i.e., a value that does not have a fixed effect, as in the case of linear cuts corresponding to the "digital" adjustment described previously.

Preferably, in order to prevent propagation of cracks along the curved cut it is expedient for the slope of the curve to be such as to prevent excessively closed curves or sudden changes in direction.

In various embodiments, the curved cut is made while the resistance is measured continuously, for instance by reducing the slope of the curve as the optimal value is approached, preferably in such a way that the aforesaid final value of the calibration corresponds to the tangent of the aforesaid curve, the curve being then made to drop as far as the next aperture in such a way that the last part of the curved cut does not substantially affect the value of the resistance, at the same time obtaining a cut that terminates in an aperture.

As mentioned previously, the calibration described above may be used for calibrating a transducer, such as for example a pressure sensor.

Figure 10:
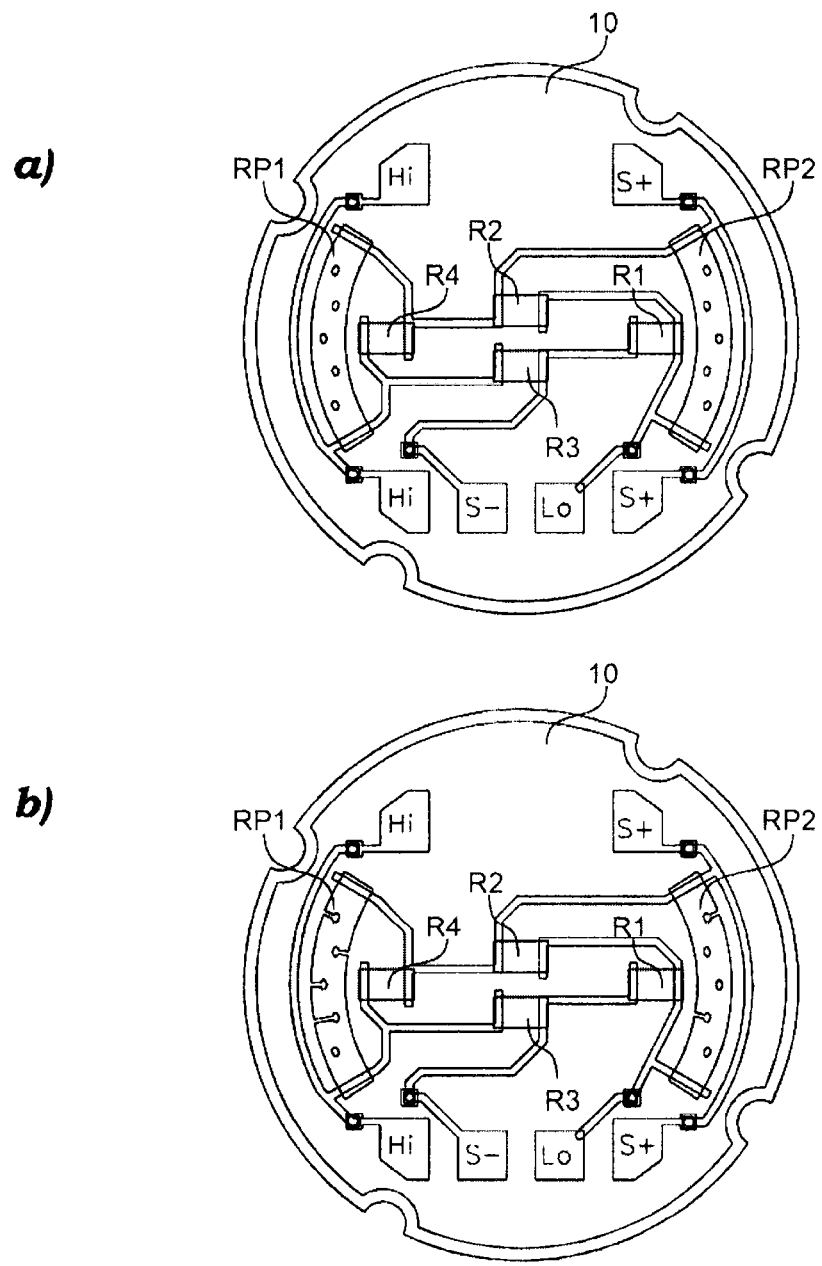
FIGS. 10a and 10b show an embodiment of a pressure sensor that uses the calibration element described herein.

FIG. 10a shows a possible embodiment of a pressure sensor 1 according to the present solution.

Figure 1:
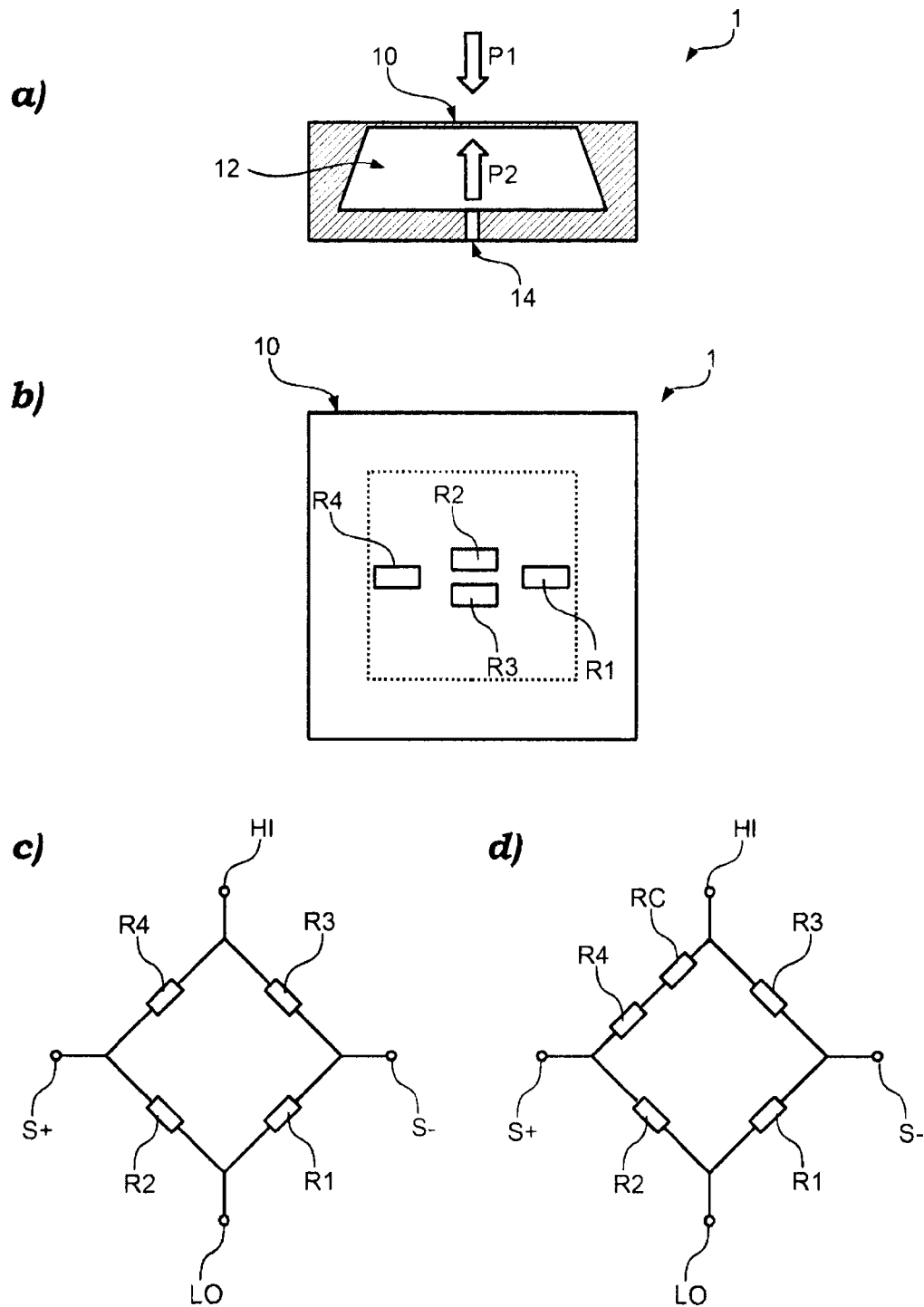

In the embodiment considered, the pressure sensor 1 comprises four strain gauges, such as for example piezoresistive elements R1, R2, R3, and R4, which are connected together according to the circuit diagram shown in FIG. 1c. For the basic operation of the aforesaid sensor reference is hence made to what has been described previously.

For instance, in the case of piezoresistive elements, the elements R1, R2, R3, and R4 may be serigraphed directly on the membrane 10 of the pressure sensor 1. However, as a result of the production spread, the aforesaid elements may have slightly different values, and the bridge may be unbalanced, i.e., the condition of Eq. (4) is not satisfied.

In one embodiment, to calibrate the pressure sensor 1, the sensor also comprises at least one calibration element 30, such as a resistive element, connected in series or in parallel to at least one of the piezoresistive elements R1, R2, R3, and R4.

For instance, in the embodiment considered, two calibration elements RP1 and RP2 are used, which are connected, respectively, in parallel to the resistors R4 and R2, i.e., in parallel to the resistors of one of the branches of the Wheatstone bridge.

For instance, in one embodiment, the aforesaid calibration elements RP1 and RP2 (comprising the apertures 34) are serigraphed together with the other electrical paths of the circuit or in different steps with respect thereto on the membrane 10 of the pressure sensor. Consequently, the calibration element 30 is preferably made of a conductive and/or resistive material, such as for example metal, a metal alloy and/or a resistive material.

However, the resistive element could also be of some other type, such as a discrete component that is bonded on the membrane of the pressure sensor.

In general, to obtain the element 30, it is possible to use any process designed for the purpose, such as a process for producing integrated circuits or printed circuits. For instance, for piezoresistive sensors, the element 30 could be obtained even directly in the silicon, potentially with doping, and just the electrical contacts 302 and 304 may be made of a metal material.

Next, the electrical resistances of the elements RP1 and RP2 are adjusted to compensate for any unbalancing of the bridge, in such a way as to have the differential output $V_S$ at a specific value, for example zero.

For instance, FIG. 10b shows an example of the incisions made in the calibration elements RP1 and RP2.

In particular, in the embodiment considered, the cuts are made only between the side edge and the apertures. The aforesaid cuts hence create a "serpentine" that increases the length and reduces the width of the calibration element, thus increasing the resistive value thereof. For instance, in the case where a Wheatstone bridge is used, each cut in one of the calibration elements RP1 or RP2 shifts the output of the sensor, i.e., the signal $V_S$, by a certain amount. For instance, for a pressure sensor it is preferable for each cut to correspond to a few millivolts.

The embodiments of the calibration elements represented in FIGS. 10a and 10b moreover highlight the fact that the calibration elements 30 may also present other arbitrary shapes and not just the rectangular shape, such as curved or substantially curved shapes, for example obtained by linear stretches set to form a curved or curvilinear element 30. In the aforesaid curved arrangement of the calibration elements RP1, RP2, the corresponding cuts 32 may have a linear development, for example along a line that is orthogonal or parallel to the line on which the apertures are set, or radial, for example with respect to the centre by the respective curved element RP1 or RP2, or else the aforesaid cuts 32 could be angled with respect to one another. Consequently, also the apertures may be set on a curved line, for instance along an arc of circumference.

The force transducer or pressure sensor 10, as may be seen in FIGS. 10a and 10b, preferably envisages the aforesaid apertures 34 with oval or elliptical cross section in elements RP1 and RP2 of a reduced width, in particular in order to reduce the overall dimensions of the force transducer or pressure sensor 10.

Thus, in general, it is sufficient for the calibration element 30 to comprise a plurality of apertures 34 having predetermined profiles. The value of the resistance of the calibration element 30 is subsequently set via segments of cut, which may be cuts:

a) between an edge of the element 30 and an aperture 34, and/or b) between two apertures 34.

Preferably, these cuts are made linearly in a longitudinal direction and/or in a lateral or transverse direction.

Finally, the calibration element 30 does not necessarily have to be provided via a single strip, but could comprise different portions.

Figure 11:
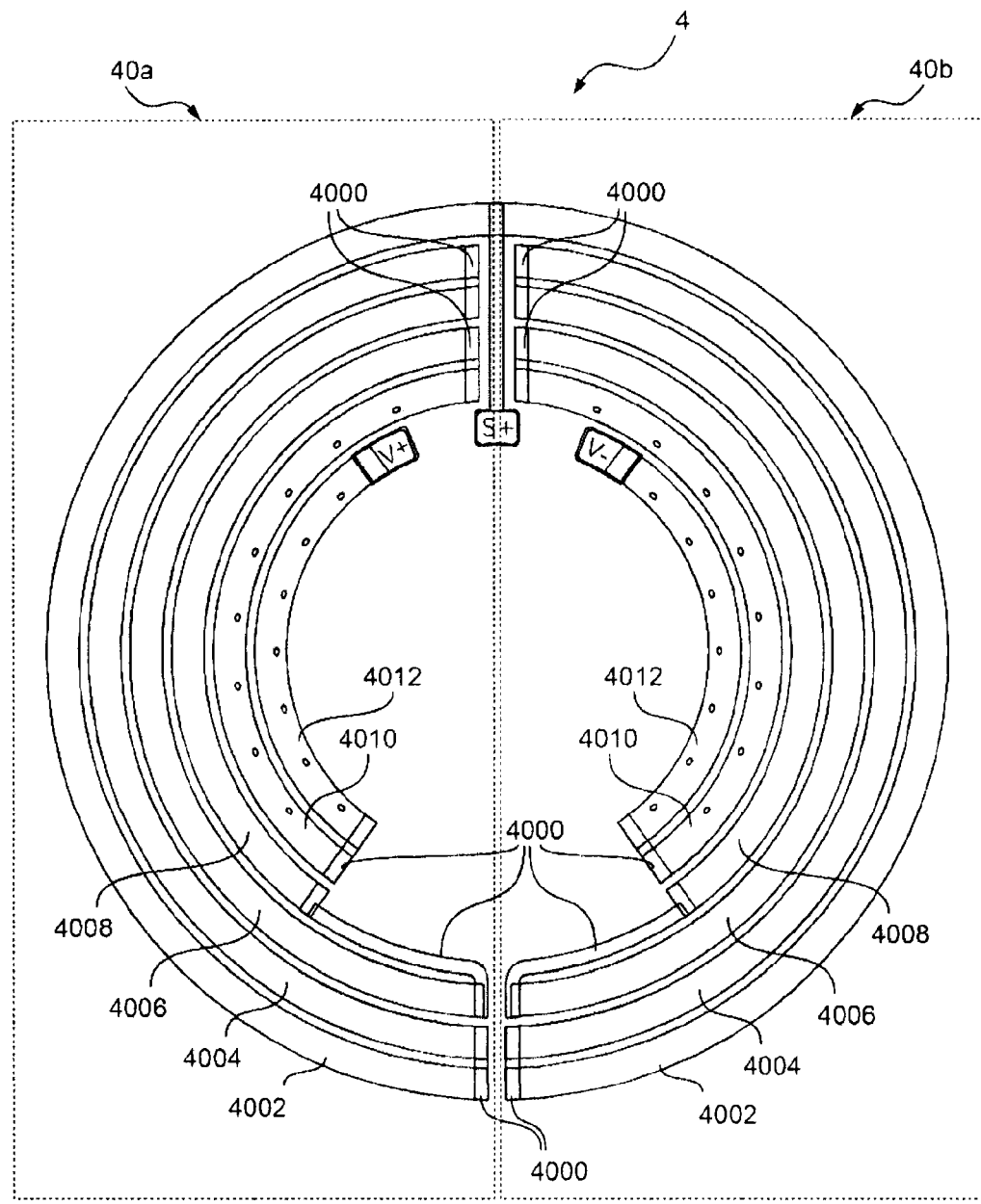
FIG. 11 shows a heater that uses the calibration element described herein.

For instance, FIG. 11 shows an embodiment of a resistive heater 4.

In particular, in the embodiment considered, the resistive heater 4 is provided via an electrical path. The aforesaid electrical path comprises at least two terminals V+ and V− for connection of a supply signal.

In this way, the electric power absorbed by the electrical path is converted into heat, and an adjustment of the electrical resistance of the path may consequently be provided in order to regulate the value of power dissipated. In the embodiment considered, the electrical path is provided via two resistive elements 40a and 40b, preferably symmetrical to one another or the same as one another.

In this case, it may prove useful to adjust the electrical resistance of the resistive elements 40a and 40b even independently of one another. For instance, in the embodiment considered, a further terminal S+ is provided for the aforesaid purpose, which enables measurement of the resistance of the resistive elements 40a and 40b independently. For instance, in the embodiment considered, the resistive element 40a is connected between the terminals V+ and S+, and the resistive element 40b is connected between the terminals S+ and V−. In this way, it is also possible to adjust the resistive elements 40a and 40b in such a way that both of the resistive elements 40a and 40b have substantially the same resistance, and consequently generate the same heat.

In particular, in the embodiment considered, each of the elements 40a and 40b comprises three portions connected in series, where:

the first portion does not comprise apertures and is made up of four strips 4002, 4004, 4006 and 4008 made of a first material, such as a resistive material, connected in series through connection bridges 4000 made of a second material, such as a metal material;

the second portion comprises apertures set at one and the same first distance apart from one another and is made up of a single strip 4010, such as a strip of the aforesaid first material; and the third portion comprises apertures set at one and the same second distance apart from one another and is made up of a single strip 4012, such as a strip of the aforesaid first material, in which preferably the second distance is smaller than the first distance.

In this way, the first portion represents a base resistance, such as a non-adjustable resistance, the second portion represents a first adjustable resistance, such as a resistance that can be used for carrying out a coarse adjustment, and the third portion represents a second adjustable resistance, such as a resistance that can be used for carrying out a fine adjustment.

Consequently, in general, the adjustment techniques described previously can be used for all the devices or production processes in which a resistive, capacitive, and/or inductive element is to be adjusted.

For instance, the calibration element could also be used for adjusting an analog and/or hybrid circuit, such as a circuit that comprises electrical and/or electronic components produced with at least two different technologies, for example a circuit with calibration elements deposited or serigraphed on a substrate or a PCB and active or passive electronic components bonded to the aforesaid substrate or PCB.

Figure 12:
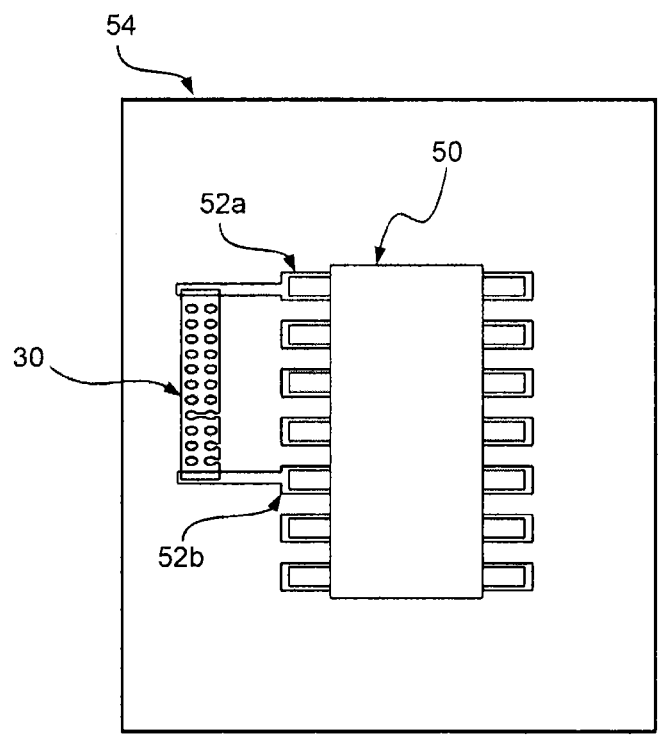
FIG. 12 shows a hybrid circuit that uses the calibration element described herein.

For instance, FIG. 12 shows a possible embodiment of a hybrid circuit. The aforesaid hybrid circuit may comprise one or more integrated circuits, for example constituted by an integrated circuit with package and terminals proper to an integrated circuit of a "die" type without package and connected via wire bonding, and also other components external to the integrated circuits, such as for example resistors, capacitors, inductors, also of the type provided with terminals and/or packages of their own, connected together to form a circuit with complex functions.

Also in this case various calibration elements may be provided, for instance for calibrating the gain of an amplifier or for calibrating the impedance of an antenna.

For instance, in the embodiment shown in FIG. 12, the circuit comprises only one integrated circuit 50, such as for example an integrated circuit with an outer package, and a calibration element 30 used for calibrating at least one electrical parameter of the integrated circuit 50.

For instance, in the embodiment considered, the package of the integrated circuit 50, such as, for example, a surface-mount-technology (SMD) package, comprises a plurality of pins 52, and the calibration element 30 is directly connected to at least two of these pins. For instance, in FIG. 12, the calibration element 30 is directly connected to the pins 52a and 52b. In the aforesaid configuration of FIG. 12, the calibration element 30 is of the type deposited on a substrate, such as a circuit printed or PCB 54, for example via deposition or serigraphy, in particular between two electrical paths.

Of course, without prejudice to the principle of the invention, the details and the embodiments may vary, even significantly, with respect to what has been described purely by way of example, without thereby departing from the scope of the invention, as defined by the annexed claims.

The invention claimed is:

1. A method for adjusting the electrical behavior or characteristics of a calibration element comprising adjusting the electrical behavior or characteristics of said calibration element by making one or more incisions or cuts in said calibration element,
   wherein said calibration element comprises a plurality of apertures, and said method comprises at least one of:
   making an incision or cut in said calibration element between an edge thereof and at least one of said apertures; or
   making an incision or cut in said calibration element between at least two of said apertures;
   wherein said apertures have profiles made up of curved stretches and linear stretches; and
   wherein the profiles made up of curved stretches and linear stretches comprise a curved stretch comprised between two linear stretches.

2. A force transducer device comprising
   a transducer substrate having a membrane portion,
   a circuit on said transducer substrate, including a detection arrangement for detecting a deformation of said membrane portion, the circuit also including at least one calibration element, wherein said at least one calibration element comprises at least one cut or incision for adjusting the electrical behavior or characteristics of said calibration element,
   wherein said at least one calibration element comprises material deposited on said transducer substrate and has a substantially curved development with a first longitudinal edge and a second longitudinal edge opposite to each other,
   wherein said at least one calibration element comprises at least one first plurality of apertures set according to a first curved line which extends along the substantially curved development of the at least one calibration element, and
   wherein said at least one cut or incision comprises at least one of:
   an incision or cut made between one said longitudinal edge of said calibration element and at least one of said apertures; or
   an incision or cut made between at least two of said apertures.

3. The device according to claim 2, wherein said apertures have a section chosen from the following:
   profiles without vertices or corners,
   polygonal profiles, in which all the vertices have an internal angle greater than 90°, r
   profiles made up of curved stretches and linear stretches,
   oval profiles, or
   elliptical profiles.

4. The device according to claim 2, wherein said curved line comprises an arc of a circumference and said first plurality of apertures includes at least three apertures.

5. The device according to claim 2, wherein the substantially curved development comprises an arc-shaped development.

6. The device according to claim 2, comprising at least one second plurality of apertures in said at least one calibration element, the apertures of said second plurality being set according to a second curved line which extends along the substantially curved development of the at least one calibration element, the apertures of the first plurality of apertures being closer to the first longitudinal edge and the apertures of the second plurality of apertures being closer to the second longitudinal edge.

7. The device according to claim 6, wherein the apertures of said first plurality of apertures are staggered with respect to the apertures of said second plurality of apertures along the substantially curved development of the at least one calibration element.

8. The device according to claim 7, wherein
   at least one said incision or cut extends between a first aperture of said first plurality of apertures and said first longitudinal edge, and
   at least one said incision or cut extends between a second aperture of said first plurality of apertures and said second longitudinal edge.

9. The device according to claim 2, wherein said at least one incision or cut extends in a radial direction with respect to the centre of the substantially curved development of the at least one calibration element.

10. The device according to claim 2, comprising two said calibration elements formed on a face of the transducer substrate,
    wherein the first longitudinal edge of each calibration element is longer than the second longitudinal edge thereof, and
    wherein the second longitudinal edge of one of said two said calibration elements faces the second longitudinal edge of the other one of said two calibration elements.

11. A method for adjusting the electrical behavior or characteristics of at least one calibration element of a device having one of an electric, electronic or hybrid circuit, the method comprising the steps of:
    i) providing a device substrate,
    ii) forming said circuit on said device substrate, the circuit including said at least one calibration element,
    iii) adjusting the electrical behavior or characteristics of said at least one calibration element by making one or more incisions or cuts in said at least one calibration element,
    wherein step ii) comprises depositing a material on said device substrate in such a way that said at least one calibration element has a substantially curved development on said device substrate, said at least one calibration element having a first longitudinal edge and a second longitudinal edge opposite to each other,
    wherein step ii) comprises providing at least one first plurality of apertures in said at least one calibration element, the apertures of said first plurality being set according to a first curved line which extends along the substantially curved development of the at least one calibration element, and
    wherein step iii) comprises at least one of:
    making at least one said incision or cut in said at least one calibration element between one said longitudinal edge and at least one of said apertures; or
    making one said incision or cut in said at least one calibration element between at least two of said apertures of the first plurality of apertures.

12. The method according to claim 11, wherein step ii) comprises providing at least one second plurality of apertures in said at least one calibration element, the apertures of said second plurality being set according to a second curved line which extends along the substantially curved development of the at least one calibration element, the apertures of the first plurality of apertures being closer to the first longitudinal edge and the apertures of the second plurality of apertures being closer to the second longitudinal edge.

13. The method according to claim 12, wherein step ii) comprises providing the apertures of said first plurality of apertures in a staggered position with respect to the apertures of said second plurality of apertures along the substantially curved development of the at least one calibration element.

14. The method according to claim 12, wherein step iii) comprises
    making at least one said incision or cut between a first aperture of said first plurality of apertures and said first longitudinal edge, and
    making at least one said incision or cut between a second aperture of said first plurality of apertures and said second longitudinal edge.

15. The method according to claim 11, wherein step iii) comprises making said at least one incision or cut to extend in a radial direction with respect to the centre of the substantially curved development of the at least one calibration element.

16. The method according to claim 11, wherein step ii) comprises forming on a face of the device substrate two said calibration elements,
    wherein the first longitudinal edge of each calibration element is longer than the second longitudinal edge thereof, and
    wherein the second longitudinal edge of one of said two said calibration elements faces the second longitudinal edge of the other one of said two calibration elements.

17. The method according to claim 11, wherein
    said curved line comprises an arc of circumference and said first plurality of apertures includes at least three apertures, and
    said curved development is an arc-shaped development.

18. A device comprising at least one calibration element, wherein said at least one calibration element comprises at least one cut or incision for adjusting the electrical behavior or characteristics of said calibration element,
    wherein said at least one calibration element has a first longitudinal edge and a second longitudinal edge opposite to each other, which extend in a length direction of the at least one calibration element,
    wherein said at least one calibration element comprises a plurality of apertures and at least one of:
        an incision or cut made between one said longitudinal edge of said calibration element and at least one of said apertures; or
        an incision or cut made between at least two of said apertures,
    wherein said apertures have a length dimension and a width dimension, the length dimension being greater that the width dimension,
    wherein said apertures are defined in said at least one calibration element with the corresponding width dimension that is set transverse to the longitudinal edges of the at least one calibration element, and
    wherein said apertures have a section chosen from the following:
        profiles made up of curved stretches and linear stretches including a curved stretch comprised between two linear stretches,
        oval profiles,
        elliptical profiles.

19. The device according to claim 18, wherein said at least one calibration element is one of:
    a resistive element, said apertures and said incisions or cuts being provided for adjusting electrical resistance of said resistive element;
    a capacitive element, said apertures and said incisions or cuts being provided for adjusting capacitance of said capacitive element; or
    an inductive element, said apertures and said incisions or cuts being provided for adjusting inductance of said inductive element.

* * * * *